United States Patent
Crabtree et al.

(10) Patent No.: US 11,203,811 B2
(45) Date of Patent: Dec. 21, 2021

(54) CORROSION INHIBITORS FOR OILFIELD APPLICATIONS

(71) Applicant: Stepan Company, Northfield, IL (US)

(72) Inventors: Alla Crabtree, Katy, TX (US); Laura Lee Whitlock, Highland Park, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 16/807,683

(22) Filed: Mar. 3, 2020

(65) Prior Publication Data

US 2020/0199440 A1    Jun. 25, 2020

Related U.S. Application Data

(63) Continuation of application No. PCT/US2018/049494, filed on Sep. 5, 2018.

(60) Provisional application No. 62/555,206, filed on Sep. 7, 2017.

(51) Int. Cl.
*C23F 11/16* (2006.01)
*C09K 8/54* (2006.01)
*C23F 11/10* (2006.01)

(52) U.S. Cl.
CPC ............... *C23F 11/16* (2013.01); *C09K 8/54* (2013.01); *C23F 11/10* (2013.01); *C09K 2208/32* (2013.01); *C23F 11/163* (2013.01)

(58) Field of Classification Search
CPC ............................. C23F 11/16; C23F 11/163
See application file for complete search history.

(56) References Cited

U.S. PATENT DOCUMENTS

| | | | | |
|---|---|---|---|---|
| 3,414,517 A | * | 12/1968 | Marsh | C10M 3/00 508/405 |
| 2004/0144957 A1 | * | 7/2004 | Miksic | C23F 11/10 252/391 |
| 2006/0194700 A1 | * | 8/2006 | Gatlin | C09K 8/22 507/140 |
| 2007/0125542 A1 | * | 6/2007 | Wei | C09K 8/602 166/308.2 |
| 2013/0081820 A1 | | 4/2013 | Falana et al. | |
| 2014/0151041 A1 | | 6/2014 | Hernandez Altamirano et al. | |
| 2015/0010429 A1 | * | 1/2015 | Hatchman | C23F 11/04 422/12 |
| 2015/0011453 A1 | | 1/2015 | Bennett et al. | |
| 2016/0017204 A1 | * | 1/2016 | Hill | C09K 8/62 166/305.1 |
| 2016/0107289 A1 | * | 4/2016 | Cavanaugh | C09G 1/02 216/53 |

OTHER PUBLICATIONS

International Search Report and Written Opinion, dated Oct. 25, 2018, in connection with PCT/US2018/049494.
International Preliminary Report on Patentability, dated Mar. 19, 2020, in connection with PCT/US2018/049494.

* cited by examiner

*Primary Examiner* — Katie L. Hammer
(74) *Attorney, Agent, or Firm* — McAndrews, Held & Malloy, Ltd.

(57) ABSTRACT

A corrosion inhibitor active and method for reducing corrosion of a metal surface in contact with a corrosive environment is disclosed. The corrosion inhibitor active is an organic sulfonated compound that is derived from the sulfonation of one or more carboxylic acids, internal olefins, or alpha-olefins having a carbon chain length of 15 to 26 carbon atoms. The method of reducing corrosion includes contacting the metal surface with an effective amount of the corrosion inhibitor active. The corrosion inhibitor active is useful in high temperature corrosive environments, such as those found in oil and gas operations.

14 Claims, No Drawings

CORROSION INHIBITORS FOR OILFIELD APPLICATIONS

CROSS REFERENCE TO RELATED APPLICATIONS

This application is a continuation of PCT application No. PCT/US2018/049494, filed Sep. 5, 2018, which claims priority to United States Provisional Application No. 62/555,206, filed Sep. 7, 2017. The entire specifications of the PCT and provisional application referred to above are hereby incorporated by reference.

BACKGROUND OF THE INVENTION

The present technology relates to a method for inhibiting corrosion of metal surfaces within a corrosive environment, particularly environments that exhibit high temperature and pressure conditions, such as those present in oilfield operations. In particular, the present technology relates to the use of particular organic sulfonates as corrosion inhibitor actives to mitigate corrosion in oilfield applications.

Corrosion of metal surfaces has been a well-known problem in the oil and gas industry. Oil and gas systems are typically exposed to a variety of corrosive agents, such as carbon dioxide, hydrogen sulfide, and brines of different salinities during the production, or acids during stimulation. These corrosive agents cause oxidation, deterioration, and/or general loss of metal from oil and gas system equipment, such as piping, tubing, and other metallic equipment or tools used in subterranean formations, as well as in surface operations. Corrosion of metal surfaces in off-shore or deep-sea operations is even more troublesome due to the difficulty in replacing corroded metal equipment in such operations.

A number of corrosion inhibitors have been developed to reduce or prevent metal corrosion in oil and gas production equipment. Corrosion inhibitors are typically blends of various chemicals in an appropriate solvent package. Common corrosion inhibitor actives include phosphate esters, dimer/trimer fatty acids, mercaptans, amines, and condensation products of fatty acids with polyamines, such as quaternary ammonium compounds and imidazolines. One drawback of some of these corrosion inhibitor actives is that they have not been satisfactory under high temperature greater than about 250° F. (121° C.).

There is therefore a need for improved corrosion inhibitor actives that can decrease corrosion of metals in oil and gas production equipment. It would also be desirable to employ corrosion inhibitors that are stable at temperatures of 250° F. (121° C.) or greater.

SUMMARY OF THE INVENTION

In one aspect, the present technology is directed to a method of treating a metal surface exposed to a corrosive environment to decrease corrosion of the metal surface by introducing a sulfonate corrosion inhibitor active into a corrosive environment in contact with the metal surface, in an amount effective to decrease corrosion of the metal surface, wherein the sulfonate corrosion inhibitor active is selected from internal olefin sulfonates having a carbon chain length of 15 to 26 carbon atoms, alpha sulfonated fatty acid esters having a carbon chain length of 15 to 26 carbon atoms, alpha-olefin sulfonates having a carbon chain length of 15 to 26 carbon atoms, and sulfonated fatty acid salts having an average carbon chain length of at least 15 carbon atoms.

In a further aspect, the present technology is directed to the use of sulfonated organic compounds as corrosion inhibitor actives, wherein the sulfonated compounds are derived from one or more carboxylic acids, internal olefins, or alpha olefins having a carbon chain length of 15 to 26 carbon atoms, and are selected from the group consisting of (i) internal olefin sulfonates; (ii) alpha olefin sulfonates; (iii) alpha-sulfonated fatty acid esters; and (iv) sulfonated carboxylic acid salts.

DETAILED DESCRIPTION OF THE PREFERRED EMBODIMENTS

The present technology relates to the discovery of organic sulfonated compounds that can be effectively used as corrosion inhibitor actives to mitigate corrosion of a metal surface exposed to a corrosive environment. The corrosion inhibitor actives are particularly useful for decreasing corrosion of metal surfaces found in oilfield operations.

As used herein, "corrosion" means the deterioration of a material as a result of chemical interactions between it and the surrounding environment. The chemical interactions may be caused by exposure to corrosive substances, such as acids, carbon dioxide, hydrogen sulfide, and brines of different salinities.

As used herein, a "corrosive environment" means any environment that, due to the presence of corrosive substances, may result in the corrosion of a material.

As used herein, a "corrosion inhibitor active" is a chemical compound that effectively decreases the corrosion rate of a metal or alloy thereof. A "corrosion inhibitor" is a formulated product comprising or consisting of several corrosion inhibitor actives.

The corrosion inhibitor actives of the present technology are particular organic sulfonated compounds that are derived from the sulfonation of internal olefins, alpha olefins, or fatty acid feedstocks. These sulfonated compounds include internal olefin sulfonates, alpha olefin sulfonates, alpha sulfonated fatty acid esters and/or salts thereof, and sulfonated unsaturated fatty acid salts.

Suitable fatty acid feedstocks from which the organic sulfonated compounds may be derived include, but are not limited to, linear or branched, saturated or unsaturated fatty acids having carbon chain lengths of 15 to 26 carbon atoms. Commercial sources containing both saturated and unsaturated fatty acids can be used as fatty acid feedstocks. The feedstocks may be derived from vegetable and/or animal sources, including but not limited to, fatty acids and fatty acid mixtures derived from canola oil, corn oil, cottonseed oil, linseed oil, olive oil, palm oil, peanut oil, rapeseed oil, safflower oil, sesame oil, soybean oil, sunflower oil, tall oil, tung oil, lard, poultry fat, BFT (bleachable fancy tallow), edible tallow, coconut oil, cuphea oil, yellow grease and combinations of these. Also contemplated are genetically modified or engineered oils that include but are not limited to high oleic sunflower or soybean oil. In some embodiments, the preferred unsaturated fatty acid feedstocks may contain reduced levels of polyunsaturated fatty acids, for example, less than 15%, alternatively less than 10%, alternatively less than 5% on a total weight basis. In some additional embodiments, the fatty acid feedstocks may be obtained by the partial hydrogenation of unsaturated triglycerides, for example soybean oil, followed by hydrolysis of the oil to afford fatty acids that are enriched in monounsaturated fatty acids and depleted in polyunsaturated fatty acids. The above-noted triglycerides optionally hydrogenated, can also be used as feedstocks, alone or in combination with fatty acids. Still further, in some embodiments, suitable feedstocks may include those that contain appreciable amounts of saturated fatty acids, for example up to about 80%, alternatively about 50%, alternatively about 30%, alternatively about 20% saturated fatty acid by weight. Alternatively, the feedstocks may be enriched in mono unsaturated fatty acids, for example, via distillation; however, undistilled feedstocks are preferred due to lower cost.

An important aspect of the present technology is that the internal olefins, alpha olefins, and fatty acid feedstocks, from which the sulfonated compounds are derived, have carbon chain lengths primarily in the range of C15 to C26. Desirably, at least 80% by weight of the carbon chains are in the range of C15 to C26. It should be understood that, although the sulfonated compounds of the present technology have carbon chain lengths primarily in the range of 15 to 26 carbons, up to 20% by weight of carbon chain lengths of less than 15 carbons and/or greater than 26 carbons may also be present in the mixture. The carbon chains can be linear, branched, or cyclic carbon chains.

The sulfonated compounds suitable for use as corrosion inhibitor additives are selected from C15-C26 internal olefin sulfonates, C15-C26 alpha olefin sulfonates, C15-C26 alpha sulfonated fatty acid esters and/or salts thereof, and C15-C26 fatty carboxylic acid salts.

Internal Olefin Sulfonates

Internal olefin sulfonates are anionic surfactants that are derived from the sulfonation of an internal olefin. Internal olefins are those that have a double bond within the carbon chain, not at its end carbon. Internal olefin sulfonates (105) that are suitable for use as a corrosion inhibitor additive are derived from the sulfonation of a C15 to C26 internal olefin or mixture of C15 to C26 internal olefins. In some embodiments, the internal olefin sulfonate may be derived from a C15-C20 internal olefin. In other embodiments, the internal olefin sulfonate may be derived from a C20-C24 internal olefin.

Alpha Olefin Sulfonates

Alpha olefin sulfonates are anionic surfactants that have a terminal sulfonate moiety at the end of a carbon chain. The alpha olefin sulfonates for use as corrosion inhibitor actives have carbon chain lengths of 15 carbon atoms or greater, preferably at least 16 carbon atoms. Suitable alpha olefin sulfonates have carbon chain lengths of C15 to C26 or mixtures of different carbon chain lengths in the range of C15 to C26. The carbon chains can be straight or branched, saturated or partially unsaturated. The alpha olefin sulfonates are typically in a neutralized salt form. Any cation that forms a water-soluble salt, such as alkali metals, e.g. sodium and potassium, and ammonium, can be used to prepare the neutralized alpha olefin sulfonates. In one embodiment, the alpha olefin sulfonate is the sodium salt of a C16-C18 alpha olefin sulfonate.

Alpha Sulfonated Fatty Acid Esters

Alpha sulfonated fatty acid esters are anionic surfactants that can be a pure alkyl ester, or a blend of a mono-cation salt (mono-salt) of an alpha sulfonated acid ester and a di-cation salt (di-salt) of an alpha sulfonated fatty acid ester. Starting feedstocks for preparing the alpha sulfonated fatty acid esters can be unsaturated or saturated fatty acids derived from palm oil, tallow, or other fatty acid.

The alpha sulfonated fatty acid esters for use as corrosion inhibitor actives comprise alkyl ester sulfonates of the structural formula:

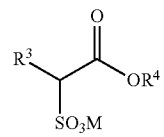

wherein $R_3$ is a $C_{13}$-$C_{24}$ hydrocarbyl group, $R_4$ is a straight or branched chain $C_1$-$C_6$ hydrocarbyl group, and M is a cation which forms a water soluble salt with the alkyl ester sulfonate. Suitable salt-forming cations include metals such as sodium, potassium, and substituted or unsubstituted ammonium cations, such as monoethanolamine, diethanolamine, and triethanolamine. In some embodiments, $R_3$ is $C_{13}$-$C_{24}$ alkyl, and $R_4$ is methyl, ethyl or isopropyl. Preferably, the alpha-sulfonated methyl esters comprise a mixture of fatty acids having an average of from 15 to 26 carbon atoms. Most preferred are alpha-sulfonated methyl esters comprising a mixture of fatty acids having an average of from about 16 to 18 carbon atoms.

Sulfonated Fatty Acid Salts

Sulfonated fatty acid salts are anionic surfactants that may be prepared by sulfonation of unsaturated fatty acids followed by neutralization with aqueous caustic. The position of the sulfonate group along the backbone of the fatty acid chains is dictated by the location of the double bond in the starting unsaturated fatty acid material (9-octadecenoic acid for example) and the "direction" in which the $SO_3$ adds across the double bond (thus, 9- and 10-sulfonate positions from oleic acid). The sulfonated fatty acid salts made by this process are believed to comprise a mixture of fatty acid sulfonate species that include internal hydroxy sulfonates of fatty acid. For example, with 9-octadecenoic acid, the sulfonate groups are believed to be attached to the 9-position and alternatively the 10-position of the fatty acid. Examples are shown below.

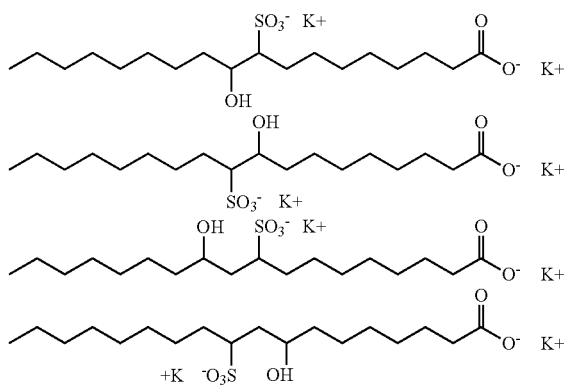

The fatty acid sulfonate species are further believed to comprise, in part, specific internal alkene sulfonates of fatty acid. These components may comprise cis- and/or trans-double bonds. It is also possible that compounds are present where the unsaturation is at the position of the sulfonate group (i.e., vinylic sulfonates). Examples are shown below.

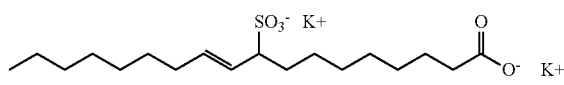

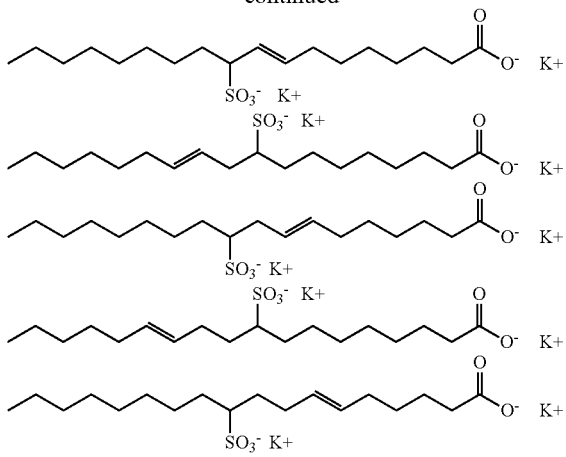

The fatty acid sulfonate species may further comprise disulfonated species, unsaturated fatty acids, and saturated fatty acids. The fatty acid sulfonate species may also comprise dimeric and higher-order oligomeric species.

The sulfonated fatty acid salts suitable for use as corrosion inhibitor additives are derived from unsaturated fatty acids, or a mixture of unsaturated and saturated fatty acids, having carbon chain lengths of 15 to 26 carbon atoms. In one embodiment, the sulfonated fatty acid salt is derived from a C16-C18 unsaturated fatty acid feedstock.

The corrosion inhibitor actives may comprise about 10 wt. % to about 50 wt. % of the corrosion inhibitor formulation in a solvent. Alternatively, the active amount of the corrosion inhibitor active may be about 15 wt. % to about 40 wt. %, alternatively, about 35 wt. %. The solvent is present in the formulation in an amount to total 100% of the formulation. Suitable solvents for the corrosion inhibitor formulation include water, methanol, ethanol, propanol, isopropanol, butanol, isobutanol, ethylene glycol monobutyl ether, monoethylene glycol, diethylene glycol, triethylene glycol, propylene glycol, dipropylene glycol, and combinations thereof. The solvent aids in delivery of the corrosion inhibitor additive to the corrosive environment, and helps to provide suitable viscosity properties.

The corrosion inhibitor may optionally include at least one additional corrosion inhibitor active. Such corrosion inhibitor actives can be, but are not limited to, quaternary ammonium compounds, phosphate esters, amines, amides, imidazolines, mercaptans, or combinations thereof. The corrosion inhibitor may also be blended with one or more additional components, such as hydrate inhibitors, scale inhibitors, biocides demulsifiers, oxygen scavengers, or combinations thereof. Suitable corrosion inhibitors comprise about 10% to about 50% by weight of sulfonated corrosion inhibitor active, from 0% up to 40% by weight of the additional corrosion inhibitor actives and/or the additional components, and the remainder solvent, to total 100%.

The corrosion inhibitors are introduced into a corrosive environment in an amount effective to reduce corrosion of a metal surface compared to an uninhibited system. An effective amount will depend in part on the content of a particular sulfonated compound being used as the corrosion inhibitor active, the metal surface to be treated, and the nature of the corrosive environment. Typically, an effective amount of corrosion inhibitor will be about 10 ppm to about 200 ppm based on the total fluids in the corrosive environment.

One advantage of the sulfonated corrosion inhibitor actives of the present technology is that they are stable in high temperature environments where some conventional corrosion inhibitors fail. "High temperature" as used herein means at least 250° F. (121° C.), and may range from about 300° F. (149° C.) to 400° F. (204° C.).

The corrosion inhibitor may be introduced into the corrosive environment by any suitable method known in the art. Such methods can include continuous injection or batch treatment. Continuous injection may be performed where appropriate chemical injection equipment is available in the field along with chemical storage tanks. Batch application may be performed through the use of a treating truck comprising a storage tank containing the corrosion inhibitor and a large water tank. The treating truck travels to field locations and treats individual wells by introducing the corrosion inhibitor into the wellbore (typically downhole), usually down the annulus. The best practice for batch treating pipelines is to apply a pill of neat or diluted corrosion inhibitor between two pigs or scrapers.

The corrosion inhibitor can be dosed into a backside of a producing well using annulus space or directly into the production tubing. Dosed corrosion inhibitor travels into the well and through the production equipment. The corrosion inhibitor is adsorbed onto the surfaces of the metal components and forms a protective film or boundary layer on the surface. Any residual from the dosed corrosion inhibitor returns with the produced fluids to avoid entering the formation. The corrosion inhibitor remains on the surface of the metal to protect the surface, ensuring continued production and asset integrity.

The presently described technology and its advantages will be better understood by reference to the following examples. These examples are provided to describe specific embodiments of the present technology. By providing these examples, the inventors do not limit the scope and spirit of the present technology.

Test Method Used in the Examples

A Rotating Cylinder Electrode (RCE) Test is one of the testing methodologies used to evaluate the performance of individual corrosion inhibitor actives and/or fully formulated blends under low shear conditions at atmospheric pressure and at temperatures up to 180° F. under sweet conditions ($CO_2$ only). In this test, the corrosion rate of a rotating coupon (working electrode) made of an alloy of interest is measured by one of the electrochemical techniques, such as the Linear Polarization Resistance (LPR) method. After running an uninhibited corrosion rate baseline for 4 hours, the corrosion inhibitor active is introduced into the de-aerated synthetic brine and the corrosion rate profile is monitored overnight for a total of 20-24 hours.

For the test, a glass cell was loaded with brine solution (3.5% NaCl, 0.11% $CaCl_2*2H_2O$, 0.07% $MgCl_2*6H_2O$) and warmed to 80° C. with $CO_2$ sparging for two hours. The working electrode (C1018) was rotated at 3000 rpm. After establishing a baseline corrosion rate (4 hours), each sulfonate component (35% active) was injected and the corrosion rate profile was monitored for a total test time of 20 hours. The final corrosion rate is used to calculate inhibition efficiency by comparing it to the initial uninhibited baseline according to the following equation:

$$\text{Inhibition Efficiency (or \% Protection)} = (CR_{uninh} - CR_{inh})/CR_{uninh} \times 100$$

Table 1 shows the results generated at a 25 ppm dosage of different sulfonates.

TABLE 1

| Corrosion Inhibitor Active | Corrosion Rate (mpy) | Inhibition efficiency (%) |
| --- | --- | --- |
| C12 Alpha Olefin Sulfonate | 176.2 | 52.0 |
| C14-16 Alpha Olefin Sulfonate | 62.4 | 83.0 |
| C16-18 Internal Olefin Sulfonate | 5.61 | 98.5 |
| C16-18 Alkyl Ester Sulfonate | 10.23 | 97.2 |
| C16-18 Alpha Olefin Sulfonate | 12.55 | 96.6 |
| C15-20 Internal Olefin Sulfonate | 8.02 | 97.8 |
| C20-24 Internal Olefin Sulfonate | 12.44 | 96.6 |
| blank | 367.4 | |

From the results in Table 1, it can be seen that the sulfonated compounds having carbon chain lengths of at least 15 carbon atoms provided the best protection, whereas the sulfonated compounds containing shorter carbon chain lengths were not as effective against metal corrosion. Sulfonated compounds that have chains greater than 26 carbons can be difficult to work with due to their physical properties, and are therefore less desirable than sulfonated compounds having chain lengths of 15 to 26 carbons.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A method of treating a metal surface in a corrosive environment to decrease corrosion of the metal surface, the method comprising:
   introducing a corrosion inhibitor composition into a corrosive environment in contact with the metal surface in an amount effective to decrease corrosion of the metal surface, wherein the corrosion inhibitor composition comprises:
   (a) from 10% to 50% by weight of a sulfonate corrosion inhibitor active selected from (i) internal olefin sulfonates having carbon chains, at least 80% by weight of which have a carbon chain length of 15 to 26 carbon atoms, (ii) alpha sulfonated fatty acid esters having carbon chains, at least 80% by weight of which have a carbon chain length of 15 to 26 carbon atoms, (iii) alpha-olefin sulfonates having carbon chains, at least 80% by weight of which have a carbon chain length of 15 to 26 carbon atoms, and (iv) sulfonated fatty acid salts having carbon chains, at least 80% by weight of which have a carbon chain length of 15 to 26 carbon atoms;
   (b) from 0% to 40% by weight of at least one additional component selected from the group consisting of quaternary ammonium compounds, phosphate esters, amines, amides, imidazolines, mercaptans, hydrate inhibitors, scale inhibitors, biocides, demulsifiers, oxygen scavengers, and combinations thereof; and
   (c) solvent to total 100% of the composition.

2. The method of claim 1, wherein the effective amount of the sulfonate corrosion inhibitor active is from 10 ppm to 200 ppm, based on a total volume of the corrosive environment.

3. The method of claim 1, wherein the corrosive environment is at a temperature of at least 250° F. (121° C.).

4. The method of claim 3, wherein the corrosive environment is at a temperature of 250° F. (121° C.) to 400° F. (204° C.).

5. The method of claim 1, wherein the corrosive environment is part of an oilfield operation.

6. The method of claim 5, wherein the corrosive environment is part of an offshore well.

7. The method of claim 1, wherein the corrosive environment comprises carbon dioxide.

8. The method of claim 1, wherein the corrosive environment comprises hydrogen sulfide.

9. The method of claim 1, wherein the solvent is selected from the group consisting of water, methanol, ethanol, propanol, isopropanol, butanol, isobutanol, ethylene glycol monobutyl ether, monoethylene glycol, diethylene glycol, triethylene glycol, propylene glycol, dipropylene glycol, and combinations thereof.

10. A method for reducing corrosion of a metal surface in contact with a corrosive environment comprising:
    introducing into the corrosive environment an effective amount of a corrosion inhibitor composition comprising (a) from 10 wt % to 50 wt % of at least one sulfonate corrosion inhibitor active derived from one or more carboxylic acids, internal olefins, or alpha olefins, having carbon chains wherein at least 80% by weight of the carbon chains have a length of 15 to 26 carbon atoms, wherein the sulfonate corrosion inhibitor active is selected from the group consisting of (i) internal olefin sulfonates; (ii) alpha olefin sulfonates; (iii) alpha-sulfonated fatty acid esters; and (iv) sulfonated carboxylic acid salts; (b) from 0% to 40% by weight of at least one additional component selected from the group consisting of quaternary ammonium compounds, phosphate esters, amines, amides, imidazolines, mercaptans, hydrate inhibitors, scale inhibitors, biocides, demulsifiers, oxygen scavengers, and combinations thereof; and (c) solvent to total 100% of the composition; wherein the sulfonate corrosion inhibitor active reduces corrosion of the metal surface in the corrosive environment compared to a corrosive environment that does not contain the sulfonate corrosion inhibitor active.

11. The method of claim 10, wherein the effective amount is from about 10 ppm to about 200 ppm based on a total volume of the corrosive environment.

12. The method of claim 10, wherein the solvent is selected from the group consisting of water, methanol, ethanol, propanol, isopropanol, butanol, isobutanol, ethylene glycol monobutyl ether, monoethylene glycol, diethylene glycol, triethylene glycol, propylene glycol, dipropylene glycol, and combinations thereof.

13. A corrosion inhibitor composition comprising:
    (a) from 10 wt % to 50 wt % of a sulfonate corrosion inhibitor active selected from (i) internal olefin sulfonates having carbon chains, at least 80% by weight of which have a carbon chain length of 15 to 26 carbon atoms, (ii) alpha sulfonated fatty acid esters having carbon chains, at least 80% by weight of which have a carbon chain length of 15 to 26 carbon atoms, (iii) alpha-olefin sulfonates having carbon chains, at least 80% by weight of which have a carbon chain length of 15 to 26 carbon atoms, and (iv) sulfonated fatty acid salts having a carbon chains, at least 80% by weight of which have a carbon chain length of 15 to 26 carbon atoms; and (b) from 0% to 40% by weight of at least one additional component selected from the group consisting of quaternary ammonium compounds, phosphate esters, amines, amides, imidazolines, mercaptans, hydrate inhibitors, scale inhibitors, biocides, demulsifiers, oxygen scavengers, and combinations thereof; and (c) solvent in an amount to total 100% of the composition.

14. The corrosion inhibitor composition of claim 13, wherein the solvent is selected from the group consisting of water, methanol, ethanol, propanol, isopropanol, butanol, isobutanol, ethylene glycol monobutyl ether, monoethylene glycol, diethylene glycol, triethylene glycol, propylene glycol, dipropylene glycol, and combinations thereof.

* * * * *